United States Patent
Dwari

(10) Patent No.: US 9,843,270 B2
(45) Date of Patent: Dec. 12, 2017

(54) PHASE LEG ARRANGEMENTS FOR MULTILEVEL ACTIVE RECTIFIERS

(71) Applicant: Hamilton Sundstrand Corporation, Charlotte, NC (US)

(72) Inventor: Suman Dwari, Vernon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/595,923

(22) Filed: Jan. 13, 2015

(65) Prior Publication Data

US 2016/0204713 A1 Jul. 14, 2016

(51) Int. Cl.
| | |
|---|---|
| H02M 7/217 | (2006.01) |
| H02M 5/45 | (2006.01) |
| H02M 7/06 | (2006.01) |
| H02M 7/483 | (2007.01) |
| H02M 7/487 | (2007.01) |

(52) U.S. Cl.
CPC ............. *H02M 7/217* (2013.01); *H02M 5/45* (2013.01); *H02M 7/06* (2013.01); *H02M 7/483* (2013.01); *H02M 7/487* (2013.01); *H02M 2007/4835* (2013.01)

(58) Field of Classification Search
CPC ....................................................... H02M 7/06
USPC ........................ 363/89, 65, 84, 126
See application file for complete search history.

(56) References Cited

U.S. PATENT DOCUMENTS

| | | | |
|---|---|---|---|
| 5,644,483 A | 7/1997 | Peng et al. | |
| 8,547,717 B2 | 10/2013 | Kshirsagar | |
| 2002/0145407 A1* | 10/2002 | Chang | H02M 1/4208 323/235 |
| 2006/0164875 A1 | 7/2006 | Colombi et al. | |
| 2007/0230226 A1* | 10/2007 | Lai | H02M 5/4585 363/65 |
| 2008/0002444 A1* | 1/2008 | Shekhawat | H02M 1/34 363/127 |
| 2011/0291737 A1 | 12/2011 | Kshirsagar | |
| 2014/0119074 A1 | 5/2014 | Courtney et al. | |
| 2014/0203632 A1* | 7/2014 | Kouno | H02M 7/219 307/9.1 |
| 2014/0226383 A1 | 8/2014 | Brust et al. | |

(Continued)

FOREIGN PATENT DOCUMENTS

WO WO-2013136377 A1 9/2013

OTHER PUBLICATIONS

Extended European Search Report from the European Patent Office dated Oct. 7, 2016 for Application No. EP16151021.

*Primary Examiner* — Jue Zhang
*Assistant Examiner* — Trinh Dang
(74) *Attorney, Agent, or Firm* — Locke Lord LLP; Scott D. Wofsy; Christopher J. Cillié

(57) ABSTRACT

A multilevel rectifier includes an input lead, a switching module, and a multilevel direct current (DC) link. The switching module includes a plurality of switch devices connected to the input lead. The multilevel DC link includes a positive lead, a midpoint lead, and a negative lead. each connected to the switching module. The plurality of switching module switch devices are operatively connected between the input lead and the DC link to provide a greater number of output voltage levels than the number of leads in the DC link with unidirectional power flow capability.

13 Claims, 6 Drawing Sheets

(56) References Cited

U.S. PATENT DOCUMENTS

2014/0334199 A1* 11/2014 He .................. H02M 5/458
363/37
2014/0347904 A1* 11/2014 Kinoshita ............. H02M 7/217
363/126

* cited by examiner

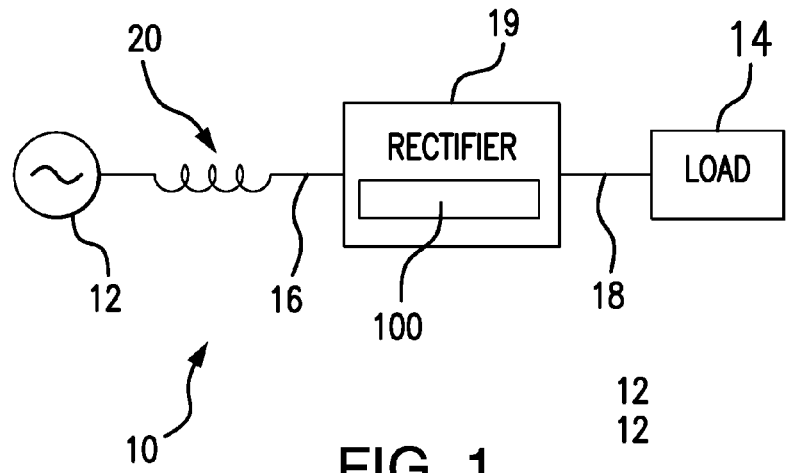
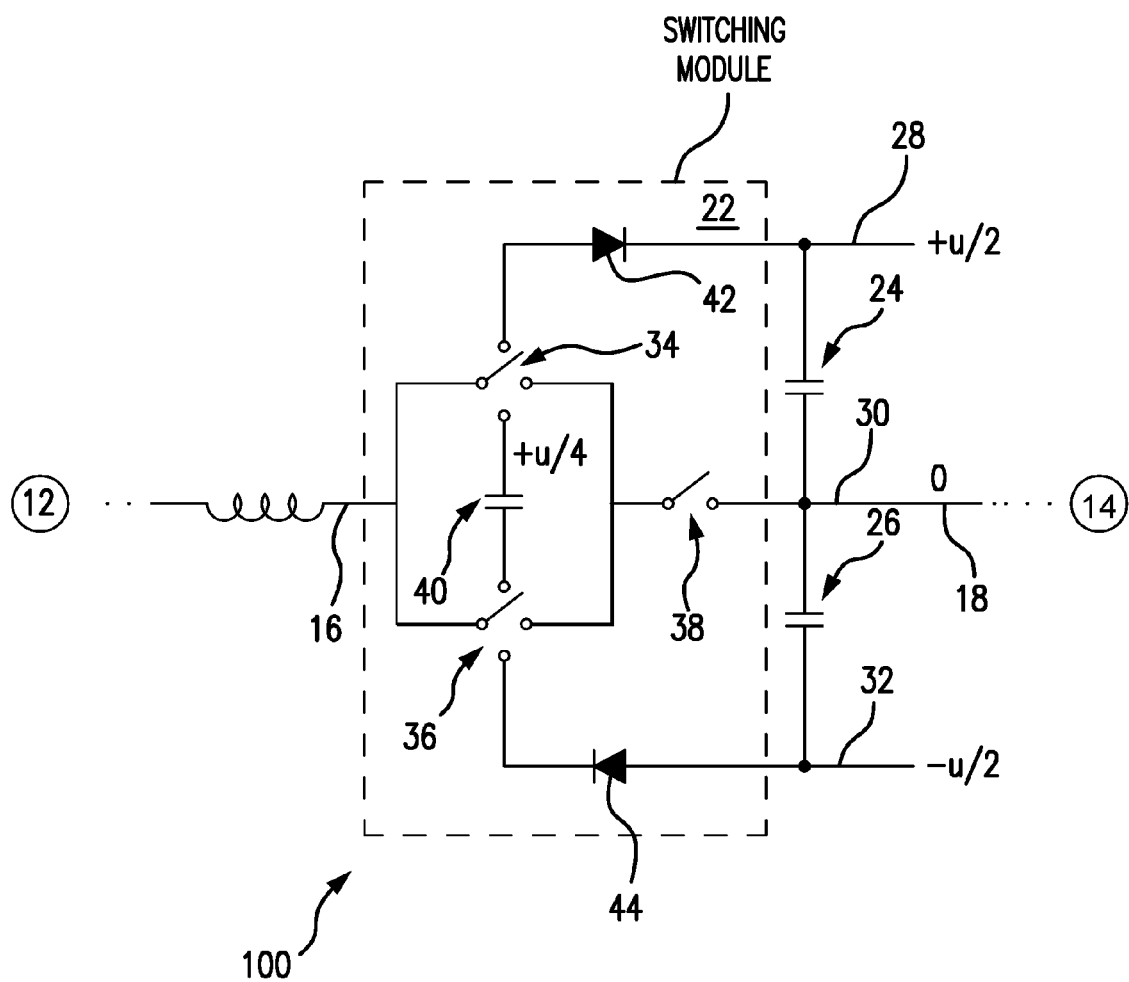
FIG. 1
FIG. 2

US 9,843,270 B2

PHASE LEG ARRANGEMENTS FOR MULTILEVEL ACTIVE RECTIFIERS

BACKGROUND OF THE INVENTION

1. Field of the Invention

The present disclosure relates to power converters, and more particularly to rectifiers for converting alternating current (AC) power into direct current (DC) power.

2. Description of Related Art

Rectifiers are commonly employed in aerospace, marine, and terrestrial vehicles, electrical power networks and systems, variable speed drives, grid interfaces for renewable energy sources, electrical energy storage systems, and telecommunications systems to convert alternating current (AC) power into direct current (DC) power. Rectifiers can include solid-state devices such as diodes, metal oxide field effect transistors (MOSFETs), insulated gate bipolar transistors (IGBTs), or gate turn-off device (GTOs) arranged between an AC power source and a DC load. Such solid-state devices typically have electrical stress limits that determine the maximum output power that a rectifier can reliably provide. Since the need of some rectifier applications can exceed the rating of such solid-state devices, some rectifiers employ the devices in a multilevel topology. Such topologies generally include numbers of solid-state devices that scale with the number of voltage levels in the topology, one exemplary N-level topology including N−1 capacitors and 2(N−1) solid-state switch devices clamped by diodes for each voltage level. Conventional topologies can also require voltage balancing circuitry to control and balance the DC link capacitor voltages, potentially reducing the power density, efficiency and reliability of such rectifiers.

Such conventional methods and systems have generally been considered satisfactory for their intended purpose. However, there is still a need in the art for improved multilevel rectifiers. There is also a continuing need for rectifiers with greater power density, reliability, and efficiency. The present disclosure provides a solution for this need.

SUMMARY OF THE INVENTION

A multilevel rectifier includes input leads, rectifier phase legs, and a multilevel direct current (DC) link. Each rectifier phase leg includes switching module to perform alternating current (AC) to direct current (DC) rectification. The switching module includes a plurality of switch devices connected between the input lead and the direct current (DC) link. The multilevel DC link includes a positive lead, a midpoint lead, and a negative lead each connected to the switching module. The plurality of switching module switch devices are operatively connected between the input lead and the DC link to provide a greater number of output voltage levels than the number of leads in the DC link.

In certain embodiments, the plurality of switching module switch devices includes a first switch and a second switch connected in parallel with one another, and in series between the input lead and the DC link leads. The switching module can also include a switching module capacitor connected between the first and second switches. A third switch can be connected in series between both the first and second switches and the DC link midpoint lead. An inductor or filters can be connected in series between the input lead and the AC source. A first capacitor can be connected between the DC link positive lead and the DC link midpoint lead and a second capacitor can be connected between the DC link midpoint lead and the DC link negative lead.

In accordance with certain embodiments the switching module can include first and second switching module diodes. The switching module first diode can be connected between the first switch and the DC link positive lead, and can be further arranged such that the switching module first diode opposes current flow from the DC link positive lead to the first switch. The switching module second diode can be connected between the second switch and the DC link negative lead, and can be arranged to oppose current flow from the second switch to the DC link negative lead to provide unidirectional current flow rectification.

It is also contemplated that in certain embodiments, the switching module first switch can include first and second MOSFET devices. The first MOSFET device can be connected between the input lead, the diode connecting to DC link positive lead, switching module capacitor and to switch connecting to the DC link midpoint lead. The second MOSFET device can be connected between the first MOSFET device, the diode connecting to the DC link positive lead, and the third switch connecting to the DC link midpoint lead. The switching module second switch can include a third and a fourth MOSFET device, the third MOSFET device being connected between the input lead, the diode connecting to the DC link negative lead, switching module capacitor and to the switch connecting to the DC link midpoint, and the fourth MOSFET device being connected between the third MOSFET device, the didoes connecting to the DC link positive lead and the third switch connecting to the DC link midpoint lead.

It is further contemplated that in certain embodiments the switching module third switch can include a pair of MOSFET devices connected in series with one another. The switching module third switch can include a first diode leg, a second diode leg, and a MOSFET device, the first and second diode legs being arranged in parallel with one another and the MOSFET device being connected between the first and second diode legs. As will be appreciated, switches can include solid-state switch devices such as insulated gate bipolar transistors (IGBT) or gate turn-off (GTO) devices.

A phase leg for an N-level rectifier includes an input lead, a first switching module connected to the input lead, at least one second switching module in series with the first switching module and a multilevel DC link with a positive lead, a midpoint lead, and a negative lead each connected to the at least one second switching module. The number of levels of the multilevel rectifier, i.e. N, is greater than or equal to 5 and evenly divisible by 2, and the number of switching modules connected in series between the DC link leads and the power source is (N−3)/2.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an exemplary embodiment of a power system including a rectifier phase leg constructed in accordance with the present disclosure, showing the rectifier. The schematic view of the exemplary embodiment illustrates only one phase; it is to be understood and appreciated that rectifier may consists of any number of phase, as suitable for a given application;

FIG. 2 is a circuit diagram for the rectifier phase leg of FIG. 1, showing a switching module and bridging capacitors disposed between respective pairs of DC link leads;

DETAILED DESCRIPTION OF THE PREFERRED EMBODIMENTS

Figure 3:
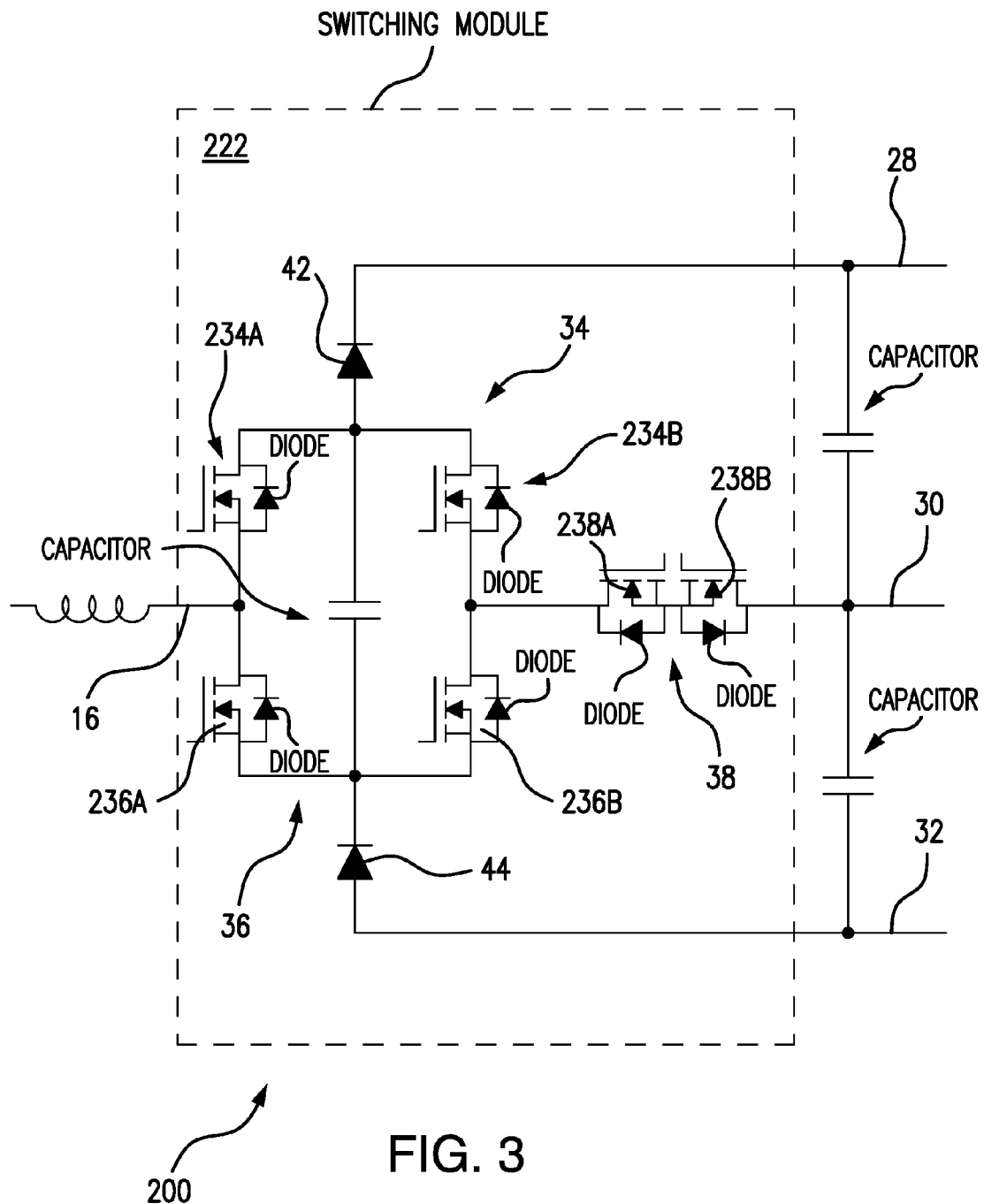
FIG. 3 is a circuit diagram of an embodiment of a phase leg of FIG. 1, showing switch devices including solid-state MOSFET devices.

Reference will now be made to the drawings wherein like reference numerals identify similar structural features or aspects of the subject disclosure. For purposes of explanation and illustration, and not limitation, a partial view of an exemplary embodiment of the rectifier in accordance with the disclosure is shown in FIG. 1 and is designated generally by reference character 100. Other embodiments of rectifiers phase legs and/or rectifiers in accordance with the disclosure, or aspects thereof, are provided in FIGS. 2-9, as will be described. The systems and methods described herein can be used for power distribution systems, such as in aircraft electrical systems.

As shown in FIG. 1, a power system 10 includes a power source 12, a load 14, and rectifier 19. Rectifier 19 includes a phase leg 100 connected to an input lead 16 and a direct current (DC) link 18. Input lead 16 connects phase leg 100 with power source 12 for receiving power from power source 12. For a multiphase alternating current (AC) system, the number input leads is equal to or in accordance to the number of phases of the system and the rectifier 19 includes same number of phase legs 100. DC link 18 connects phase leg 100 to load 14. Power system 10 also includes an inductor or filter 20 connected between power source 12 and rectifier 19. As will be appreciated, inductor or filter 20 can be an integral component of rectifier 19. Alternatively, inductor or filter 20 can be a part of power system 10 and independent from rectifier 19. Power source 12 can be an alternating current (AC) source, such as a single phase of a multiphase AC power source for supplying variable or constant frequency AC power to rectifier 19 through input lead 16. Load 14 is a DC power-consuming device, and can be a motor, inverter, or any other electrical apparatus requiring DC power incorporated into an aircraft electrical system.

With reference to FIG. 2, phase leg 100 of rectifier 19 is shown. Phase leg 100 is electrically connected to input lead 16, DC link 18, a switching module 22, a first DC link capacitor 24, and a second DC link capacitor 26. DC link 18 includes a DC link positive lead 28, a DC link midpoint lead 30, and a DC link negative lead 32. First DC link capacitor 24 connects between DC link positive lead 28 and DC link midpoint lead 30. Second DC link capacitor 26 connects between DC link midpoint lead 30 and DC link negative lead 32. Voltages of the first DC link capacitor 24 and second DC link capacitor 26 are maintained to be balanced to achieve successful operation of the rectifier phase legs actively, and can provide a desired voltage at the DC link leads coupled by the each of the respective DC link capacitors.

Switching module 22 includes a plurality of solid-state components interconnected with one another and connected between input lead 16 and DC link 18. In this respect switching module 22 includes a first switch 34, a second switch 36, and a third switch 38. First switch 34, second switch 36, and third switch 38 are connected to input lead 16. First switch 34 and second switch 36 are connected in parallel with one another. First switch 34 and second switch 36 are also connected in series between the input lead 16 and DC link positive lead 28, DC link midpoint lead 30, and DC link negative lead 32. Third switch 38 is connected in series between both first switch 34 and second switch 36 and DC link midpoint lead 18. First switch 34, second switch 36, and third switch 38 are also operatively connected to DC link 18 such that phase leg 100 provides a greater number of voltage levels to DC link 18 than levels, i.e. physical leads, of DC line 18. In the illustrated embodiment switching module 22 is configured and adapted for providing five voltage levels to the three leads of DC link 18.

Switching module 22 also includes a switching module capacitor 40, a switching module first diode 42, and a switching module second diode 44. Switching module capacitor 40 is connected between first switch 34 and second switch 36. This arrangement provides a self-balanced flying capacitor 40 to switching module 22 because the average charge and discharge of the capacitor is controlled to be balanced over the course of the rectification cycle such that the voltage of the flying capacitor 40 is maintained to be substantially constant. For example, with reference to FIG. 4, the voltage of flying capacitor 40 is maintained at around +U/4. Self-balancing of flying capacitor 40 can enable switching module 102 to provide a greater number of output voltage levels at the input lead 16, e.g. +U/4 and −U/4, in addition to the voltages of levels of multilevel DC link 18, e.g. +U/2, 0, and −U/2.

Switching module first diode 42 is connected between first switch 34 and DC link positive lead 28, and is arranged such to oppose current flow from DC link positive lead 28 to first switch 34. Switching module second diode 44 is connected between second switch 36 and DC link negative lead 32, and is arranged to oppose current flow from second switch 36 to DC link negative lead 32. Such arrangement of the diodes and connections to the DC link positive lead 28 and the DC link negative lead 32 provides unidirectional rectification.

With reference to FIG. 3, a phase leg 200 is shown. Phase leg 200 is similar to phase leg 100 and additionally includes a first switch 34, a second switch 36, and a third switch 38 realized with MOSFET devices. In this respect each of first switch 34, second switch 36, and third switch 38 includes MOSFET pairs. As will be appreciated, the MOSFET devices are controlled to be opened or closed using appropriate gate voltages applied selectively to MOSFET subsets using a controller during the rectification cycle in active control regime.

As illustrated in FIG. 3, first switch 34 includes a first MOSFET device 234A and a second MOSFET device 234B. First MOSFET device 234A is connected between input lead 16 and both switching module first diode 42 and second MOSFET device 234B. This arrangement selectively couples first MOSFET device 234A between DC link positive lead 28 and/or DC link midpoint lead 18. Second MOSFET device 234B is connected between input lead 16 and DC link midpoint lead 30.

As also illustrated in FIG. 3, second switch 36 includes a first MOSFET device 236A and a second MOSFET device 236B. First MOSFET device 234A is connected between input lead 16 and both switching module second diode 42 and second MOSFET device 234B. This enables selectively coupling first MOSFET device 234A between DC link negative lead 32 and/or DC link midpoint lead 18. Second MOSFET device 236B is connected between input lead 16 and DC link midpoint lead 30.

As further illustrated in FIG. 3, third switch 38 includes a first MOSFET device 238A and a second MOSFET device 238B. First MOSFET device 238A and second MOSFET device 238B are connected in series between a node A, disposed between second MOSFET device 234B of first switch 234 and second MOSFET device 236B of second switch 238, and DC link midpoint lead 30. First MOSFET device 238A and second MOSFET device 238B are connected in series with one another such that source of one is connected to a drain of the other.

Figure 4:
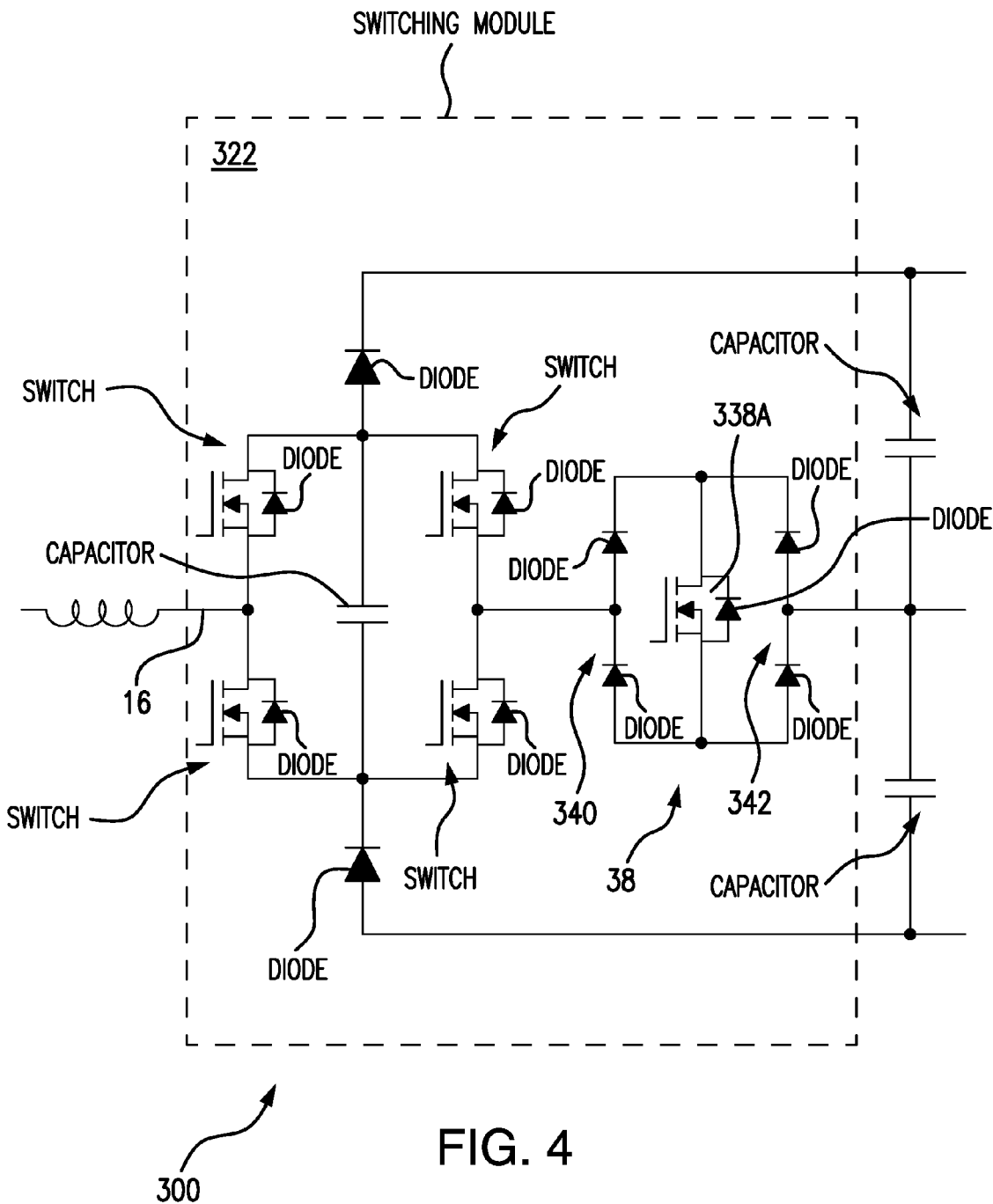
FIG. 4 is a circuit diagram of another embodiment of a phase leg of FIG. 1, showing a third switch including parallel diode legs and a MOSFET device.

With reference to FIG. 4, a phase leg 300 is shown. Phase leg 300 is similar to phase leg 200 with the difference that third switch 38 includes a single MOSFET device 338 connected between a first diode leg 340 and a second diode leg 342. First diode leg 340 and second diode leg 342 each include a pair of diodes. A source of single MOSFET device 338 connects between first ends of first diode pair 340 and second diode pair 342, and a drain of single MOSFET 338 connects between opposite second ends of first diode pair 340 and second diode pair 342. This presents an alternative implementation of third switch 38 including fewer MOSFET devices and with the same circuit functionality as realized in phase leg 200 (shown in FIG. 3).

Figure 5:
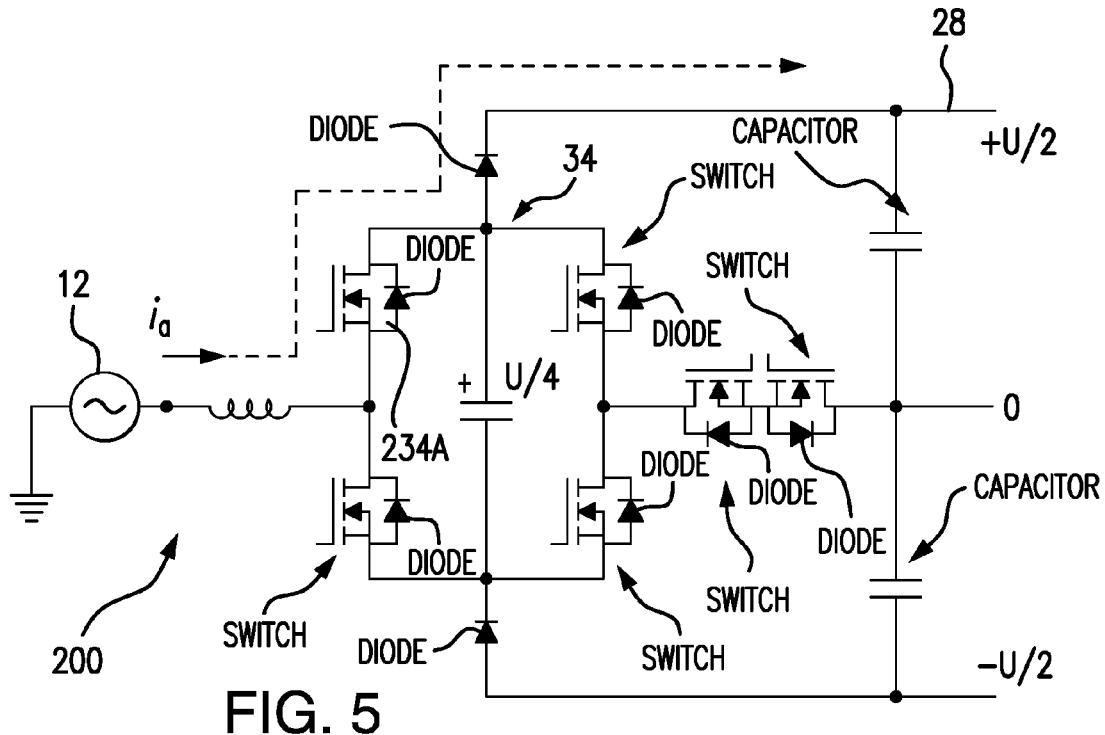
FIGS. 5-8 are current flow diagrams of current flow through the phase leg of FIG. 3, showing exemplary operating modes of phase legs described herein during the positive portion of the rectification cycle.
Figure 6:
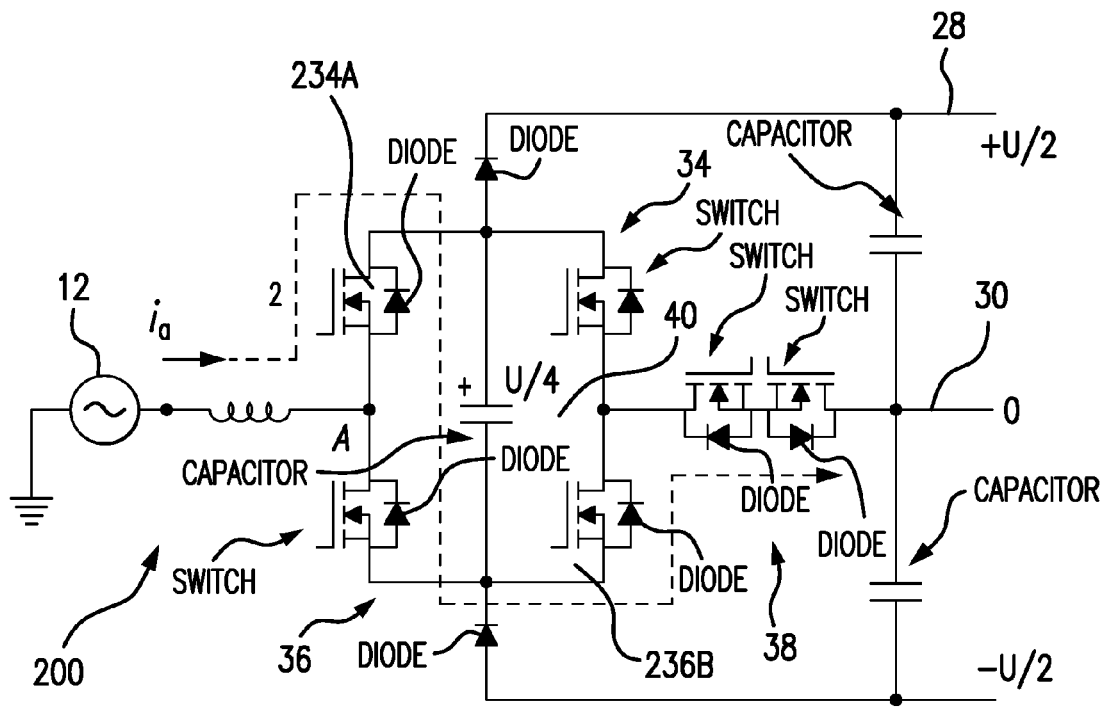
Figure 7:
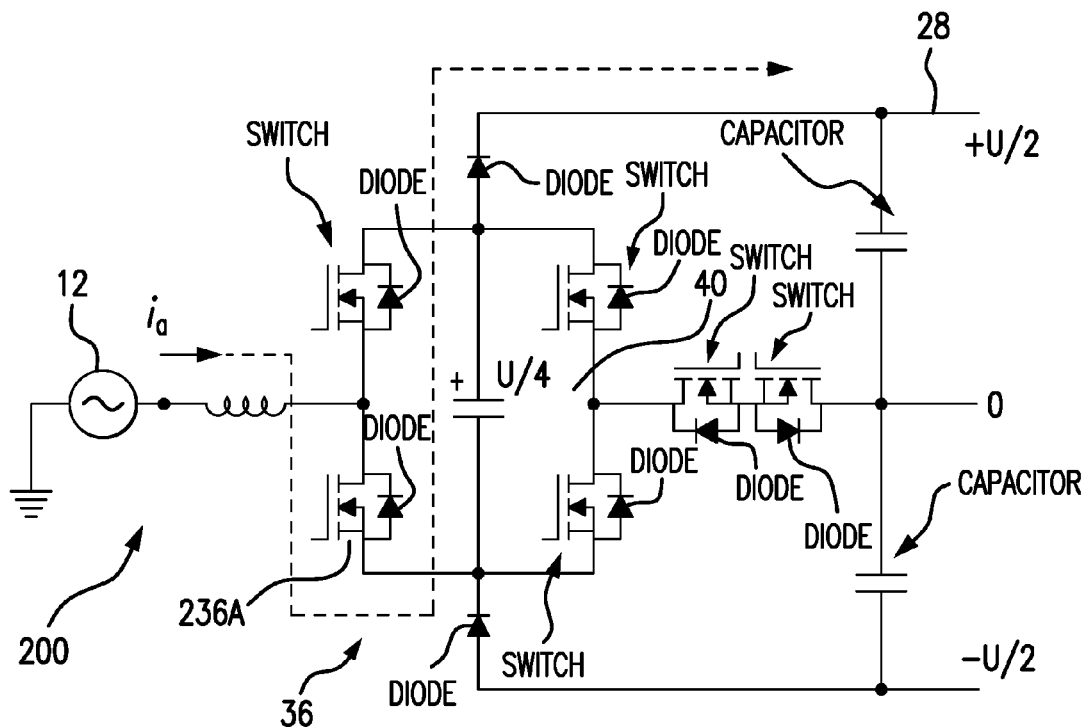
Figure 8:
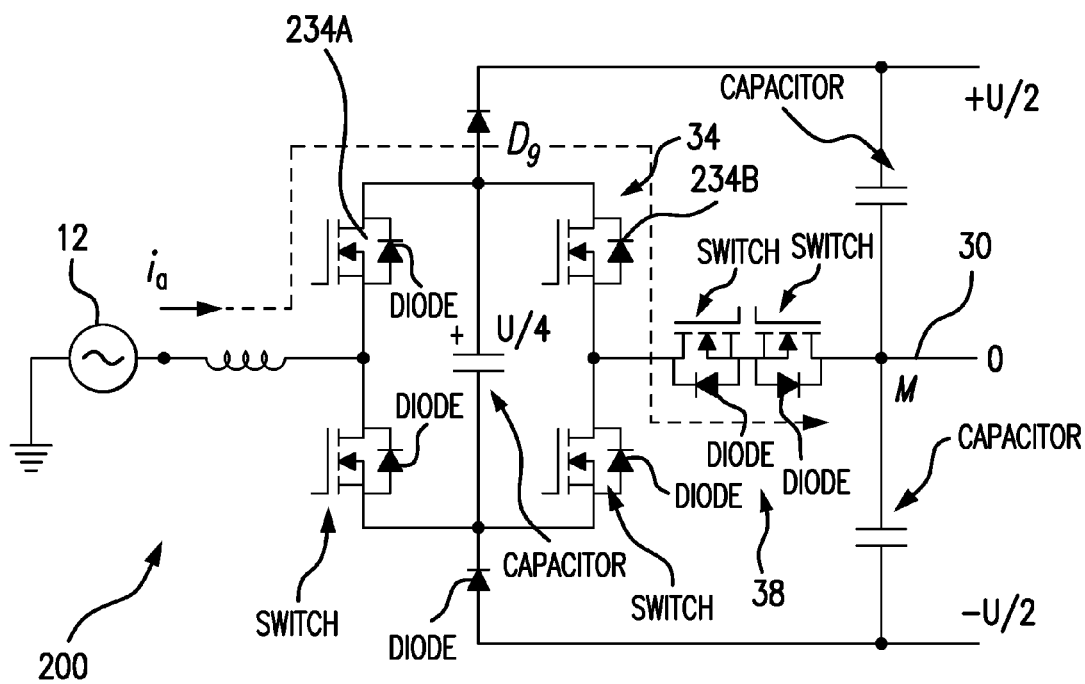

With reference to FIGS. 5-8, current flow is shown through phase leg 200 during a positive current flow period of the rectification cycle, according to an embodiment. As shown in FIG. 5, current flows between power source 12 and DC link positive lead 28 through first MOSFET 234A of first switch 34 in a first mode (i). As shown in FIG. 6, current flows between power source 12 and DC link midpoint lead 30 through first MOSFET device 234A of first switch 34, switching module capacitor 40, second MOSFET device 236B of second switch 36, and MOSFET devices of third switch 238 during a second mode (ii). The switching module capacitor 40 charges during second mode (ii). As shown in FIG. 7, current flows between power source 12 and DC link positive lead 30 through first MOSFET device 236A of second switch 36 and switching module capacitor 40 during a third mode (iii). Switching module capacitor 40 discharges during third mode (iii). As shown in FIG. 8, current flows between power source 12 and DC link midpoint lead 30 through both first MOSFET device 234A and second MOSFET device 234B of first switch 34 in a fourth mode (iv).

In first mode (i) and fourth mode (iv), output voltage is +U/2 and 0, respectively. In second mode (ii) and third mode (iii) voltage U/2 is provided in conjunction with charging and discharging of switching module capacitor 40. As will be appreciated, corresponding current flows occur during the negative phase of the rectification cycle. As will also be appreciated, similar unidirectional current flow modes occur in phase leg 100 (shown in FIG. 2) and in phase leg 300 (shown in FIG. 4) during the rectification cycle.

Figure 9:
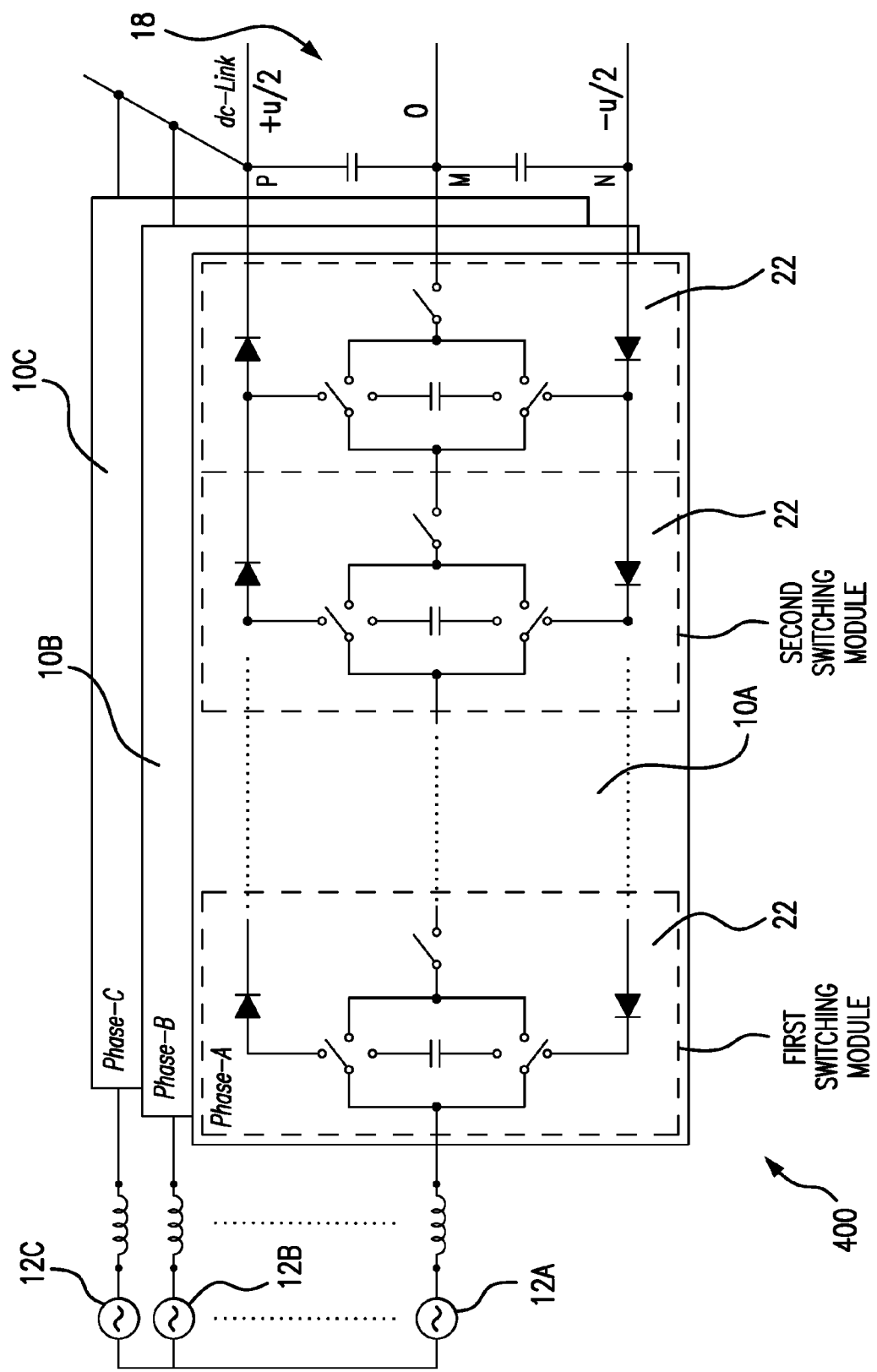
FIG. 9 is a circuit diagram of an embodiment of a rectifier phase leg having a plurality of switching modules, showing how the rectifier can scale with the incorporation of additional switching modules to provide various and/or power source phases.

With reference to FIG. 9, a phase leg 400 is shown for a generalized N-level P-phase unidirectional rectifier. Phase leg 400 is similar to phase leg 100, and additionally a first rectifier phase 10A, a second rectifier phase 10B, a third rectifier phase 10C. First rectifier phase 10A, second rectifier phase 10B, and third rectifier phase 10C are similar to one another and respectively include a plurality of switching modules 22 connected in series with one another between power source 12 and DC link 18. This provides N voltage levels, N being a number greater than 5 that is divisible by 2, realized with (N−3)/2 switching modules connected in series between power source 12 and DC link 18. As illustrated, phase leg 400 has three phases. It is to be understood and appreciated that phase leg 400 can have more than three phases or any P number of phases, as suitable for a given application.

In embodiments of multilevel rectifier phase legs described herein, a phase leg for a five-level rectifier includes a switching module connected between a source and a DC link having a DC link positive lead, a DC link reference lead, and a DC link negative lead. The phase leg includes two voltage level capacitors arranged between respective DC link leads, e.g. a first voltage capacitor arranged between the DC link positive lead and the DC link reference lead and second voltage level capacitor arranged between the DC link reference lead and the DC link negative lead. The switching module includes a self-balanced flying capacitor, three solid-state switch devices, and two diodes for providing a five-level voltage output to the DC link leads using unidirectional rectification and active neutral point clamping. The switches are controlled for connecting the flying capacitor to the three DC link leads such that the charge of the flying capacitor is maintained. This provides can provide multilevel rectifier phase legs with fewer solid-state components, e.g. four switch devices versus eight switch devices; two diodes versus six diodes. In certain embodiments, the rectifier phase legs have relatively high power density, greater efficiency, and/or are relatively lightweight of the rectifier. It is also contemplated that the unidirectional functionality can provide a regeneration blocking capability with relatively high power quality, and in certain embodiments, without the need for a voltage balancing circuit—further improving power density, reducing component count and complexity, and/or improving efficiency and reliability.

The methods and systems of the present disclosure, as described above and shown in the drawings, provided for rectifier phase legs and/or rectifier phase legs with superior properties including lightweight construction. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A multilevel rectifier, comprising:
an input lead;
a switching module with a plurality of switch devices connected to the input lead; and
a multilevel direct current (DC) link with a positive lead, a midpoint lead, and a negative lead each connected to the switching module,
wherein the plurality of switch devices are operatively connected between the input lead and the multilevel DC link;
wherein the plurality of switch devices includes a first switch and a second switch, wherein the first and second switches are in parallel with one another and in series between the multilevel DC link and the input lead, wherein the switching module further includes a third switch connected in series between both the first and second switches and the midpoint lead, wherein the third switch includes a first diode leg, a second diode leg, and a MOSFET device, wherein the first and second diode legs are arranged in parallel with one another, and wherein the MOSFET device is connected between the first and second diode legs.

2. The multilevel rectifier as recited in claim 1, wherein the switching module further includes a switching module capacitor connected between the first and second switches.

3. The multilevel rectifier as recited in claim 1, wherein the switching module further includes a switching module first diode connected between the first switch and the positive lead, wherein the switching module first diode is arranged to oppose current flow from the positive lead to the first switch.

4. The multilevel rectifier as recited in claim 1, wherein the switching module further includes a switching module second diode connected between the second switch and the negative lead, wherein the switching module second diode is arranged to oppose current flow from the second switch to the negative lead.

5. The multilevel rectifier as recited in claim 1, wherein the first switch includes first and second MOSFET devices, wherein the first MOSFET device is connected between the input lead, a switching module first diode connected to the positive lead, the switching module capacitor, and the second MOSFET device, wherein the second MOSFET device is connected between the first MOSFET device, the switching module capacitor, and the midpoint lead.

6. The multilevel rectifier as recited in claim 1, further comprising an inductor or filters connected between the input lead and an input source.

7. The multilevel rectifier as recited in claim 1, further comprising a first capacitor and a second capacitor, wherein the first capacitor is connected between the positive lead and the midpoint lead, wherein the second capacitor is connected between the midpoint lead and the negative lead.

8. The multilevel rectifier as recited in claim 1, further including an alternating current (AC) power source phase connected to the input lead via an inductor or filters.

9. The multilevel rectifier as recited in claim 5, wherein the second switch includes third and fourth MOSFET devices, wherein the third MOSFET device is connected between the input lead, a switching module second diode connected to the negative lead, the switching module capacitor, and the fourth MOSFET device, wherein the fourth MOSFET device is connected between the third MOSFET device, the switching module capacitor, and the third switch of the switching module.

10. An N-level rectifier, wherein N is a number of voltage levels of the N-level rectifier, comprising:
an input lead;
a first switching module connected to the input lead;
at least one second switching module in series with the first switching module; and
a multilevel direct current (DC) link with a positive lead, a midpoint lead, and a negative lead each connected to the at least one second switching module;
wherein both the first and second switching modules include a plurality of switch devices operatively connected between the input lead and the positive lead, the midpoint lead, and the negative lead;
wherein N is a number greater than or equal to 5;
wherein a number of second switching modules is equal to (N−3)/2; and
wherein the switching modules each include a first switch, a second switch, a third switch, and a switching module capacitor,
wherein the first and second switches are in parallel with one another, wherein the first and second switches are in series between the input lead and direct current link, and
wherein the switching module capacitor is connected between the first and second switches,
wherein the third switch is connected in series between both the first and second switches and the midpoint lead, wherein the third switch includes a first diode leg, a second diode leg, and a MOSFET device, wherein the first and second diode legs are arranged in parallel with one another, and wherein the MOSFET device is connected between the first and second diode legs.

11. A method of rectifying alternating current (AC) power into direct current (DC) power, comprising:
flowing current from an AC power source to a DC link positive lead through a first MOSFET device of a first switch;
flowing AC current from the AC power source to a DC link midpoint lead through the first MOSFET device of the first switch, a switching module capacitor, and a second MOSFET device of a second switch, and MOSFET devices of a third switch;
flowing current from the AC power source to the DC link positive lead through a first MOSFET device of the second switch and the switching module capacitor; and
flowing current from the AC power source to the DC link midpoint lead through both the first MOSFET device and a second MOSFET device of the first switch.

12. The method as recited in claim 11, further comprising charging the switching module capacitor while flowing AC current from the AC power source to a DC link midpoint lead through the first MOSFET device of the first switch, a switching module capacitor, and a second MOSFET device of a second switch, and MOSFET devices of a third switch.

13. The method as recited in claim 11, further comprising discharging the switching module capacitor while flowing current from the AC power source to the DC link positive lead through a first MOSFET device of the second switch and the switching module capacitor.

\* \* \* \* \*